INVENTOR.
E. P. BROWNING

United States Patent Office 3,385,132
Patented May 28, 1968

3,385,132
TRANSMISSION CONTROL
Edgar Paul Browning, Cedar Falls, Iowa, assignor to Deere & Company, Moline, Ill., a corporation of Delaware
Filed May 23, 1966, Ser. No. 552,111
10 Claims. (Cl. 74—689)

ABSTRACT OF THE DISCLOSURE

A combined variable-speed and planetary transmission having an engine-driven shaft which drives a variable-speed shaft through an infinitely-variable belt drive. The variable-speed shaft drives the sun gear of the planetary train, the ring gear of which is clutchable to the output shaft. An annular collar is hydraulically shiftable on the planetary carrier to lock the ring gear to the carrier, locking up the gear train so that the output is driven by the variable-speed shaft; or to connect the carrier to the engine-driven shaft, establishing a dual input drive through the planetary gear train.

---

This invention relates to a transmission control and more particularly to such a control having specific utility for shifting a combined infinitely-variable and planetary-type vehicle drive into different speed ranges.

It is known to control the speed of two elements of a three-element vehicle planetary gear train to produce a wide variety of speeds in the third or output element, and further to drive one of the elements at an infinitely variable speed for infinite speed variation within a limited range, while the planetary elements are selectively clutchable to each other or to the input elements to provide different speed ranges. Both friction and collar-type clutches have been utilized in such transmissions, although previous transmissions utilizing collar-type clutches have required more than one clutch collar or have been difficult to shift.

The primary object of the present invention is to provide an improved transmission of the type described above, utilizing a single, shiftable clutch collar to change the speed range, and further to provide such a transmission having a novel control for smooth and effortless shifting of the clutch collar, even when the vehicle is in motion. Another object is to provide such a transmission with a selectively engageable clutch in its output to permit emergency stops or maneuvering of the vehicle in close quarters, and further to control the output clutch so that the transmission output is temporarily disconnected from the final drive of the vehicle during the shifting of the clutch collar, facilitating shifting of the clutch collar when the vehicle is in motion. Still another object is to provide such a control system which produces only a relatively brief torque interruption during the changing of the speed ranges.

These and other objects inherent in the invention will become apparent from the following detailed description and accompanying drawings wherein.

Figure 1:
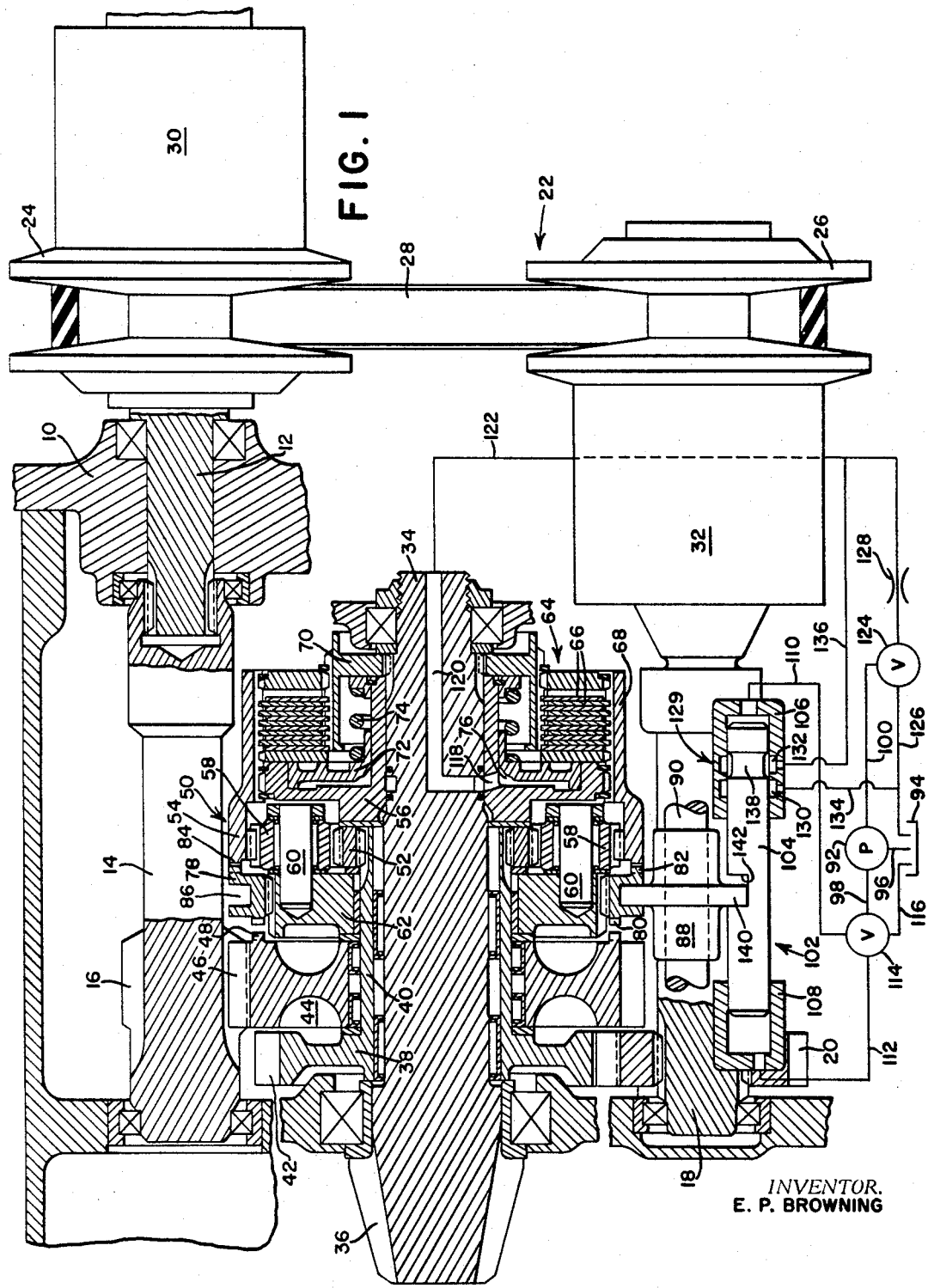
FIG. 1 is a partly schematic, longitudinal section of the transmission and control therefor.

The illustrative transmission includes a housing 10, only a portion of which is shown, and a shaft 12, which is journaled in the housing and, in a conventional agricultural tractor, extends rearwardly from and is driven by an internal combustion engine (not shown), generally governed to operate at a constant speed. The above orientation is established for the purpose of clarity only, and it is to be understood that such words as "fore-and-aft," etc., are not to be construed as limiting the invention. Nor is it intended to limit the invention to agricultural vehicle transmissions or to the particular transmission illustrated.

The shaft 12 includes a rear portion 14 journaled in the housing 10 and forming a spur gear means 16. Also journaled in the housing 10, parallel to the shaft 12, is a variable-speed shaft 18, which carries a spur gear 20 at its rearward end and which is connected to and driven by the shaft 12 via a variable-speed drive 22, including a variable-diameter drive sheave 24 coaxially affixed to the shaft 12, a variable-diameter driven sheave 26 coaxially affixed to the shaft 18, and an endless belt or driving element 28 interconnecting the sheaves 24 and 26 to drive the shaft 18 at an infinitely variable speed relative to the shaft 12 within a limited range, the diameters of the sheaves 24 and 26 being respectively established in a known manner by control cylinders 30 and 32.

An output shaft 34 is also journaled in the housing 10, parallel to and between the shafts 14 and 18, and includes an output gear 36 at its rearward end. Coaxially journaled on the output shaft 34 is an annular input member 38 having a forwardly extending hub or sleeve portion 40 and a peripheral gear means 42 meshing with the variable-speed shaft gear 20, so that the speed of the input member 38 varies with the speed of the variable-speed shaft 18. A second input member 44 is journaled on the variable-speed input member hub 40 and includes peripheral gear means 46, meshing with the constant-speed shaft gear 16, and a coaxial ring of forwardly facing teeth 48.

Also coaxial with the output shaft 34 is a planetary gear train 50, including a sun gear 52 coaxially splined to the forward end of the input member hub 40, a ring gear 54 having an annular hub portion 56 journaled on the shaft 34, and a plurality of planetary pinions 58 journaled on pinion shafts 60 attached to a planetary carrier 62, rotatable on the hub 40.

The ring gear 54 is selectively connectible to the output shaft 34 by a clutch means, indicated in its entirety by the numeral 64, including a plurality of annular friction-type clutch plates 66 alternately splined to an internally splined, forwardly extending, annular ring gear portion 68 and an externally splined hub 70 coaxially attached to the shaft 34. The clutch plates 66 are compressed into engagement by an annular piston 72 acting against a clutch spring 74 in response to fluid pressure in an annular chamber 76 formed by the ring gear hub portion 56.

An annular clutch collar or coupling member 87, having a ring of rearward face teeth 80 and forward face teeth 82 is coaxially splined to the periphery of the planetary carrier 62 for axial shifting movement thereon between a rearward position wherein the teeth 80 mesh with the input member face teeth 48 and a forward position wherein the forward face teeth 82 mesh with a ring of rearward face teeth 84 on the ring gear 54. The clutch collar 78 has an annular groove 86 which accommodates a shifter member 88 axially slidable on a shifter shaft 90 parallel to the shaft 34.

The shifter 88 and the clutch means 64 are both actuated by a control means, which includes a source of fluid pressure 92 connected to an associated reservoir 94 by an inlet line 96 and having a pair of outlet lines 98 and 100. A two-way hydraulic motor 102 includes a piston 104 axially parallel to the shifter shaft 90 and mounted at opposite ends in forward and rearward cylinders 106 and 108 having inlet lines 110 and 112 respectively, the cylinders 106 and 108 being selectively pressurized or connected to the reservoir 94 by a selector valve 114 pressurized by the outlet line 98 and connected to the reservoir by a sump line 116. As previously described, the clutch means 64 is engaged by pressure in the chamber 76, which is connected to the fluid pressure source 92 by a passage 118 through the ring gear hub portion 56, a passage 120 through the output shaft 34, and an inlet line 122 connected to the pump outlet line 100 by a normally open clutch selector valve 124, which, in a conventional vehicle, is generally controlled by an operator-actuated clutch pedal and connects the clutch inlet line 122 to the reservoir 94 via a line 126 only when the clutch pedal is depressed. An orifice 128 restricts the flow of fluid from the valve 124 to the clutch means 64.

The piston 104 and the forward cylinder 106 form a third valve means 129, which includes adjacent ports 130 and 132 in the cylinder 106, respectively connected to the reservoir line 126 by a line 134 and to the clutch inlet line 122 by a line 136 downstream of the orifice 128. The piston 104 has an annular recess 138 which communicates with the forward or rearward port 132 or 130 in the extreme rearward or forward positions of the piston and interconnects the ports 130, 132 only when shifting between these positions.

The piston 104 includes a groove 142, which accommodates a circumferential rib 140 on the shifter 88, the groove 142 having a substantially greater axial dimension than the rib 140 to provide a lost-motion connection between the shifter 88 and the piston 104, so that the shifter 88 does not move during the initial portion of the piston movement.

In operation, when the clutch collar 78 is shifted to its forward position, as shown in the drawing, it connects the planetary ring gear 54 to the planetary carrier 62, thereby locking up the planetary gear train 50 so that the output or ring gear 54 is driven at the same speed as the sun gear 52, which of course is positively connected to the variable-speed shaft 18 by the variable-speed input member 38. The clutch collar 78 is maintained in this position by the piston 104 via the shifter 88, the selector valve 114 being positioned to connect the rearward cylinder 108 to the pressure source 92 and the forward cylinder 106 to the reservoir via the lines 116 and 110. Pressure is also supplied to the clutch means 64 through the normally open clutch valve 124, so that the ring gear 54 drives the output shaft 34. The output shaft can be selectively disconnected from the ring gear by actuating the valve 124, conventionally by depressing the clutch pedal, so that the clutch inlet line 122 is connected to the reservoir 94, the relieved clutch pressure permitting the clutch spring 74 to shift the piston 76 to a clutch-disengaging position.

If a lower output speed is desired than can be provided in high range, the speed of the variable-speed shaft 18 is reduced to its minimum speed by adjusting the variable-speed drive means 22, the transmission gear ratios preferably being such that the speed of the variable-speed input member 42 is synchronous with the constant-speed input member 44 at the minimum speed of the variable-speed shaft 18. When the synchronous speed is reached, the selector valve 114 is actuated to connect the rearward cylinder 108 to the reservoir via the lines 116 and 112 and connect the forward cylinder 106 to the fluid pressure source 92 via the lines 98 and 110, thereby initiating rearward movement of the piston 104. Since there is substantial clearance between the forward edge of the groove 142 and the shifter rib 140, the first portion of the piston movement does not move the shifter 88 or the clutch collar 78 attached thereto. However, this initial movement does actuate the valve means 129, connecting the ports 130 and 132, whereby the clutch inlet line 122 is connected to the reservoir. Since the clutch selector valve 124 normally remains in an open condition during the shifting sequence, the inlet line 122 is still connected to the fluid pressure source 92. However, the orifice 128 restricts the fluid flow to a lesser quantity than flows through the line 136, so that the clutch means 64 will remain disengaged as long as the ports 130 and 132 are interconnected. The clutch disengagement, of course, disconnects the planetary gear train 50 from the vehicle drive wheels, facilitating the shifting of the clutch collar 78. After the clutch means 64 is disengaged, the forward end of the piston groove 142 engages the shifter rib 140, so that additional movement of the piston 104 moves the shifter 88, disconnecting the clutch collar 78 from the ring gear 54 and moving it into engagement with the face teeth 48 of the constant-speed input member 44. In this position, the carrier is driven at a relatively constant speed by the input member 44, while the sun gear 52 is driven at a variable speed by the input member 38, providing a reduced speed in the output or ring gear 54, the ring gear speed reducing as the speed of the variable-speed input member 38 increases. When the piston 104 reaches its rearward position wherein it maintains the clutch collar 78 in engagement with the constant-speed input member 44, the piston recess 138 is opposite the port 130 only, so that the ports 130 and 132 are no longer connected and the fluid pressure is restored in the clutch chamber 76 to again connect the ring gear 54 to the output shaft. The shifting sequence is accomplished in a relatively short time, so that the torque interruption is very brief.

To shift the transmission from low range back to high range, the reverse of the above sequence is followed, the lost motion between the piston 104 and the shifter 88 again permitting the piston 104 to connect the valve ports 130 and 132 to relieve the output clutch pressure and interrupt the torque during the shifting of the clutch collar 78 back into its high position.

A slightly different embodiment of the transmission control system is shown in FIGS. 2 and 3, the system again including the fluid pressure source 92, with outlet lines 98 and 100 and inlet line 96 between the pressure source and the reservoir 94. A two-way hydraulic motor 150, similar to the previously described motor 102, includes a piston 152 mounted at opposite ends in cylinders 154 and 156 selectively pressured by the valve 114 via lines 110 and 112 respectively to shift the piston 152 and the shifter 88, which again is connected to the clutch collar and rides in a groove 158 in the piston 152, providing a lost motion connection so that the shifter does not move during the initial period of the piston movement. The valve 114 also connects the unpressurized end of the motor 150 to the reservoir via the line 116.

The piston 152 and the forward cylinder 154 form a valve means 160 having ports 162, 164, and 166, the port 162 being connected to the reservoir via the line 168, the port 164 being connected to the clutch means 64 by the line 170, and the port 166 being connected to the clutch valve 124 by the line 172, the clutch valve normally pressurizing the line 172 via the line 100 and dumping the line 172 via the line 126 only when the clutch pedal is depressed.

Figure 3:
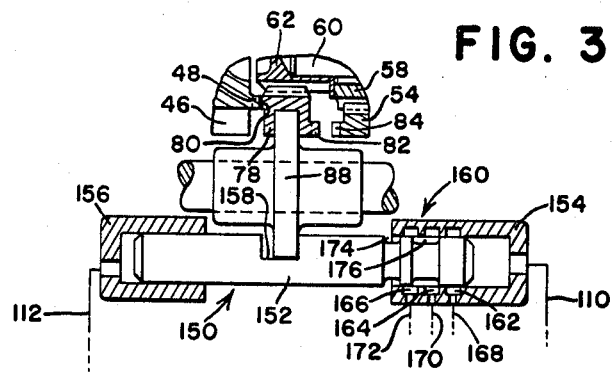
FIGS. 2 and 3 are schematic views of a slightly different embodiment of the transmission controls only, and respectively showing the transmission control in high- and low-range conditions.
Figure 2:
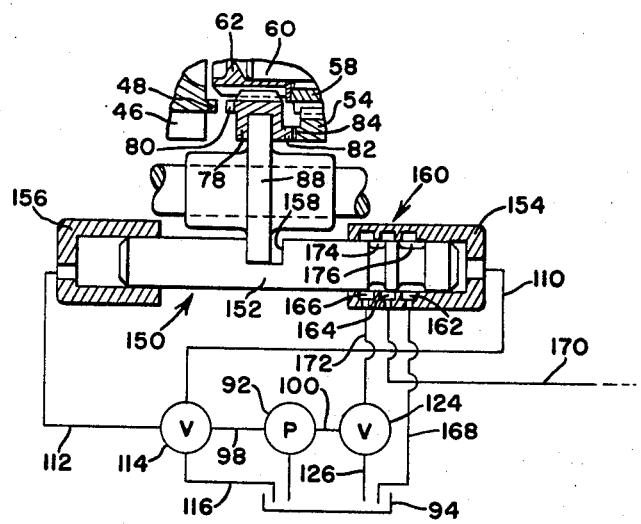

The piston 152 has two annular recesses 174 and 176, the rearward recess 174 connecting the ports 164 and 166 when the piston is shifted to its forward or high-range position, as shown in FIG. 2, thereby pressurizing the line 170 and maintaining the clutch means in engagement, assuming, of course, that the clutch valve is open. The ports 164 and 166 are similarly connected by the forward recess 176 when the piston is fully shifted to its rearward or low-range position as shown in FIG. 3.

As in the previously described embodiment, the initial rearward shifting movement of the piston causes the recess 176 to interconnect the ports 162 and 164, connecting the clutch inlet line 170 to the reservoir via the line 168. Unlike the previous embodiment, which relied on the orifice 128 to maintain the pressure flow to the clutch to a lesser amount than the dumping flow, the present embodiment completely shuts off the flow to the clutch by disconnecting the ports 164 and 166 during the original shifting movement, the pressure to the clutch again being restored after the shift is completed by connecting the ports 164 and 166 and closing the dump port 162, as shown in FIG. 3. Again the reverse sequence is followed during the shifting from low to high range, the initial forward shifting movement of the piston 152 dumping the line 170 while closing the pressure inlet port 166, before the piston starts to move the shifter 88.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A transmission comprising: an engine-driven shaft; a first input element connected to and driven by the engine-driven shaft; a planetary gear train including first, second, and third coaxially journaled planetary elements and planetary pinion means carried by one planetary element and constantly meshing with the other two; a second input element drivingly connected to the first planetary element; a variable-speed drive means connecting the engine-driven shaft to the second input element to drive it at variable speeds relative to said shaft; an output element; a clutch means selectively engageable and disengageable between the third planetary element and the output element; an annular coupling member coaxially mounted on one of said transmission elements for rotation therewith and axial shifting movement thereon between a first position wherein it drivingly connects said one element to another transmission element and a second position wherein it drivingly connects said one element to a third transmission element; and control means operably connected to said coupling member for selectively shifting it into its alternate positions.

2. The invention defined in claim 1 wherein the control means includes a first hydraulic motor having a piston shiftable between first and second positions, a connecting means between the piston and the coupling member for shifting the coupling member between its alternate positions with the piston, a source of fluid pressure having an associated reservoir, and a first selector valve means for selectively connecting the first hydraulic motor to the fluid pressure source to effect the shifting of the piston between its alternate positions.

3. The invention defined in claim 2 wherein the control means includes a second hydraulic motor connected to the clutch means and shiftable between active and neutral positions to respectively effect clutch engagement and disengagement and a second selector valve means for selectively connecting the second hydraulic motor to the fluid pressure source to shift it into its actuated position.

4. The invention defined in claim 3 wherein the control means includes a second connecting means connecting the first motor piston to the second hydraulic motor to shift the second motor into its neutral position when the piston is shifting between its alternate positions.

5. The invention defined in claim 3 wherein the control means includes a third valve means shiftable into an open position wherein it connects the second hydraulic motor to the reservoir and a closed position, and actuated by the piston into its open condition during the shifting of the piston between its alternate positions and into its closed condition when the piston is in either position.

6. The invention defined in claim 5 wherein the connecting means between the coupling member and the piston includes a lost motion mechanism whereby, as the piston moves between its alternate positions, it actuates the third valve means to disengage the clutch means before it shifts the coupling member.

7. The invention defined in claim 6 wherein the control means includes an orifice between the second valve means and the second motor to restrict the fluid flow from the second valve means to the second motor to less than the flow from the second motor to the reservoir when it is so connected.

8. In a transmission having three coaxially journaled transmission elements and an output element, the combination therewith of an annular coupling member coaxially mounted on one of the elements for rotation therewith and axial shifting thereon between a first position wherein it drivingly connects said element to a second element, and a second position wherein it drivingly connects said element to the third element; a clutch means engageable and disengageable between one of said transmission elements and the output element; a first hydraulic motor including a piston shiftable between first and second positions; a connecting means between the piston and the coupling member for shifting the coupling member between its alternate positions as the piston shifts between its alternate positions; a source of fluid pressure including an associated reservoir; a first selector valve means for selectively connecting the first hydraulic motor to the fluid pressure source to effect the shifting of the piston between its alternate positions; a second hydraulic motor connected to the clutch means and shiftable between actuated and neutral positions to respectively effect clutch engagement and disengagement; a second selector valve means for selectively connecting the second hydraulic motor to the fluid pressure source to shift it into its actuated position; and a third valve means shiftable into an open condition wherein it connects the second hydraulic motor to the reservoir and a closed condition and actuated by the piston into its open condition during the shifting of the piston between its alternate positions and into its closed condition when the piston is in either position.

9. The invention defined in claim 8 wherein the piston includes a lost motion mechanism whereby, as the piston moves between its alternate positions, it actuates the third valve means to disengage the clutch means before it shifts the coupling member and further characterized by an orifice between the second valve means and the second hydraulic motor to restrict the fluid flow from the second valve means to the second motor to less than the flow from the second motor to the reservoir when it is connected therewith.

10. The invention defined in claim 5 wherein the control means includes a fourth valve means actuated by the piston into a closed condition wherein it disconnects the second hydraulic motor from the fluid pressure source during shifting of the piston between its alternate positions, and an open condition when the piston is in either alternate position, permitting the fluid pressure flow to the second hydraulic motor.

References Cited

UNITED STATES PATENTS

| | | | |
|---|---|---|---|
| 2,966,972 | 1/1961 | Hallinger | 192—3.5 |
| 3,122,025 | 2/1964 | Mark et al. | 74—687 |
| 3,340,749 | 9/1967 | Magg et al. | 74—689 |

FRED C. MATTERN, Jr., *Primary Examiner.*

DONLEY J. STOCKING, *Examiner.*

H. S. LAYTON, *Assistant Examiner.*